July 26, 1966  F. JAKOB  3,263,068
FLASH ASSEMBLY FOR CAMERAS AND THE LIKE
Filed Aug. 22, 1961  3 Sheets-Sheet 1

INVENTOR.
FRANZ JAKOB
BY

July 26, 1966  F. JAKOB  3,263,068
FLASH ASSEMBLY FOR CAMERAS AND THE LIKE
Filed Aug. 22, 1961  3 Sheets-Sheet 2

INVENTOR.
FRANZ JAKOB
BY

July 26, 1966 F. JAKOB 3,263,068
FLASH ASSEMBLY FOR CAMERAS AND THE LIKE
Filed Aug. 22, 1961 3 Sheets-Sheet 3

INVENTOR.
FRANZ JAKOB
BY Michael S. Striker
R. Horn

United States Patent Office 3,263,068
Patented July 26, 1966

3,263,068
FLASH ASSEMBLY FOR CAMERAS AND THE LIKE
Franz Jakob, Unterhaching, near Munich, Germany, assignor to Agfa Aktiengesellschaft, Leverkusen-Bayerwerk, Germany
Filed Aug. 22, 1961, Ser. No. 133,254
Claims priority, application Germany, Aug. 30, 1960, A 35,445; Dec. 1, 1960, A 36,173
9 Claims. (Cl. 240—1.3)

The present invention relates to cameras and more particularly to flash assemblies for cameras.

Many types of modern still cameras provide the capability of making several exposures very rapidly one after the other. Some cameras, in fact, do not even require the operator to manually cock the shutter and advance the film since such cameras include motors which are capable of automatically cocking the shutter and advancing the film after each one of a number of exposures so that the operator can very rapidly make a series of exposures. However, when using flash illumination to make an exposure with cameras of this type there is a considerable delay involved in the changing of a burnt out flash lamp for a fresh flash lamp, and this delay inherent in conventional flash assemblies renders the capability of making very rapid exposures one after the other of very little value.

It is accordingly a primary object of the present invention to provide a flash assembly which makes it possible to very rapidly exchange a burnt out flash lamp for a fresh flash lamp.

Another object of the present invention is to provide a structure of this type which can be manually operated to exchange a burnt out flash lamp for a new flash lamp.

It is also an object of the present invention to provide an exceedingly compact assembly which at the same time is capable of receiving at one time a plurality of flash lamps which can be moved one after the other to the optical axis of the reflector of the flash assembly so that the flash lamps can be very rapidly used one after the other.

A still further object of the present invention is to provide a structure of this type which is very easy to load and unload so that one series of burnt out flash lamps can be removed and can be easily replaced with a plurality of fresh flash lamps.

The objects of the present invention also include the provision of a structure capable of automatically exchanging a burnt out flash lamp for a fresh flash lamp.

It is still another object of the present invention to provide a structure which will not only automatically and quickly exchange a burnt out flash lamp for a fresh flash lamp, so that such a structure may be used, for example, with those cameras which automatically cock the shutter and advance the film without causing any delay in the rapidity with which a series of exposures may be made, but which will in addition operate without any shocks so that the structure which operates automatically to exchange a burnt out flash lamp for a fresh flash lamp will not induce in the camera any vibrations which will cause unsteadiness when the camera is held manually by the operator.

It is also an object of the present invention to provide a structure which is capable of accomplishing all of the above objects and which at the same time is inexpensive, simple, rugged, and very reliable in operation.

With the above objects in view the invention includes in a flash assembly for cameras and the like, an elongated flexible band and a plurality of flash lamps distributed along and carried by this band. A reflector means receives the band and the lamps carried thereby, and a guide means guides the band for movement along a path which extends through the reflector means. The portion of the path which is in the reflector means itself has a length which is shorter than twice the distance between the lamps on the band, so that only one lamp may be located at one time in the reflector means. An advancing means cooperates with the band to advance this band in a stepwise manner through increments which will successively locate the lamps in the reflector means to be successively ignited therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
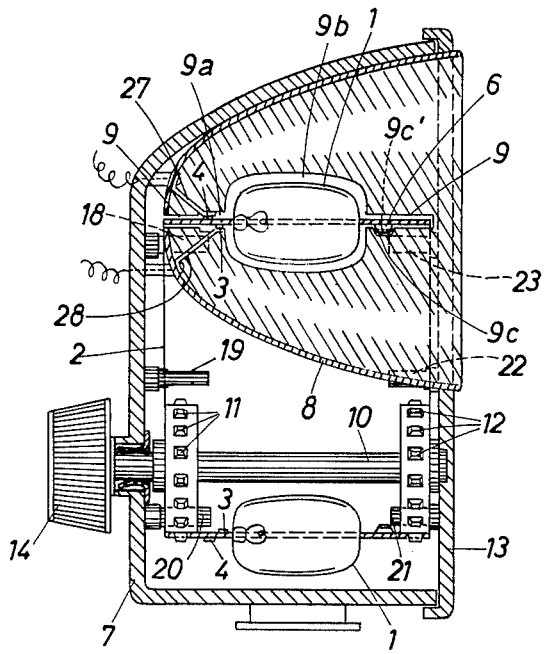
FIG. 2 is a transverse section taken along line II—II of FIG. 1 in the direction of the arrows and showing the assembly with the cover placed on the housing of the assembly.
Figure 3:
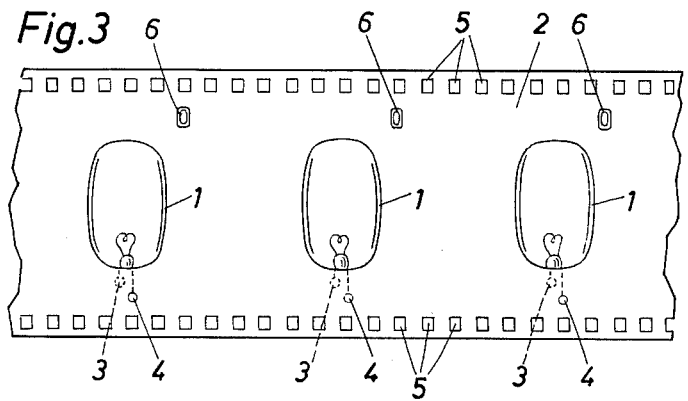
FIG. 3 is a fragmentary illustration of the band and flash lamps carried thereby.

Referring to FIG. 3, the flash lamps 1 which are used in the flash assembly of the invention are carried by an elongated flexible band 2 which is transparent and which may be made of any flexible transparent plastic material or the like. For example, the band 2 may be made of cellulose acetate, polystyrene, or the like. At predetermined distances along the band 2, this band is formed with openings which receive the lamps 1 with a relatively close fit, and it will be noted that the lamps 1 extend from opposite faces of the band 2, as is apparent from FIGS. 1 and 2, so that the thin band 2 has very little effect on the brightness provided by the flash when the lamp is ignited. Any suitable glue may be used for fixing the lamps 1 to the band 2, and the glue as well as the band 2 itself may be transparent so as to further reduce any possibility of blocking of light when the lamp is ignited. The band 2 carries a pair of contacts 3 and 4 which are connected to the ends of the filament of each of the lamps 1, as is shown most clearly in FIG. 3, and these contacts as well as the portions of the filament which extend beyond the lamp to be connected to the contacts may also be glued, for example, to the band 2. The contacts 3 and 4 may be located at either one of the opposed faces of the band 2, so as to project freely beyond these faces with each contact having an exposed end face capable of being used for completing the circuit through the lamp 1, or, if preferred, the contacts 3 and 4 may extend in opposite directions with one of the contacts exposed at one of the faces of the band 2 and the other contact exposed at the other of the faces of the band 2. This is the construction which is shown in the drawings. It will be noted that the elongated flexible band 2 is formed with a plurality of cutouts in the form of perforations 5, and there may be one or two rows of perforations respectively located adjacent the edges of the band. In the illustrated example there are two rows of perforations, as shown most clearly in FIG.

3. Finally, the band 2 carries a series of projections 6 which respectively correspond to the lamps 1 and are spaced from each other by the same distances as the lamps 1, and these projections may be made of any desired material and may be fixed as by glueing or the like to one of the faces of the band 2, in the manner shown most clearly in FIG. 3. As is apparent from FIG. 1, the band 2 is endless and in the illustrated example carries six lamps 1.

The flash assembly of the invention is carried by a housing 7, and this housing fixedly carries the reflector 8. The reflector 8 is formed at opposite sides with a pair of elongated cutouts, one of which is visible in FIG. 2. Thus, the cutout has a front relatively narrow portion 9 through which the portion of the band 2 in front of the lamps 1 is adapted to pass, and this cutout has a relatively narrow rear portion 9a through which the portion of the band 2 at the rear of the lamps 1 is adapted to pass. Between its portions 9 and 9a, the cutout has an intermediate larger portion 9b through which the lamps 1 themselves are adapted to pass, and furthermore the lower part of the portion 9 of the cutout is formed with a notch 9c through which the projections 6 are adapted to pass. The cutout which is shown in FIG. 2 on one half of the reflector 8 is identical with a second cutout on the other half of the reflector 8, this second cutout being of course aligned with and in all respects similar to the cutout which is shown in FIG. 2, so that the band and the parts carried thereby can move through the other cutout as well as the one shown in FIG. 2. Of course, the rear portion 9a of the cutout shown in FIG. 2 extends, as shown in FIG. 2, all the way to the rear of the reflector 8 and forms a continuation of the rear portion 9a of the unillustrated cutout on the other half of the reflector 8 which is not visible in FIG. 2. The only difference between the two cutouts is that the notch 9c' of the cutout which is not visible in FIG. 2 is, as shown by the dotted line in FIG. 2, shallower than the notch 9c shown in FIG. 2, so that when the projections 6 respectively reach the other notch 9c', they will extend slightly beyond the edge of the other notch 9c' to give an appreciable resistance to movement of the band 2, and when the operator advances the band 2 he will feel this resistance and will know that the next lamp 1 has been properly located in position in the reflector. As will be apparent from the description below, in order to locate the next lamp in position in the reflector, the operator only has to apply a somewhat larger pressure so as to force the temporarily blocked projection 6 through the shallower notch 9c' which is not visible in FIG. 2, and then the operator advances the band until he feels the next projection 6 engage the shallower notch 9c', and the operator knows that the next lamp is in position to be ignited.

Figure 1:
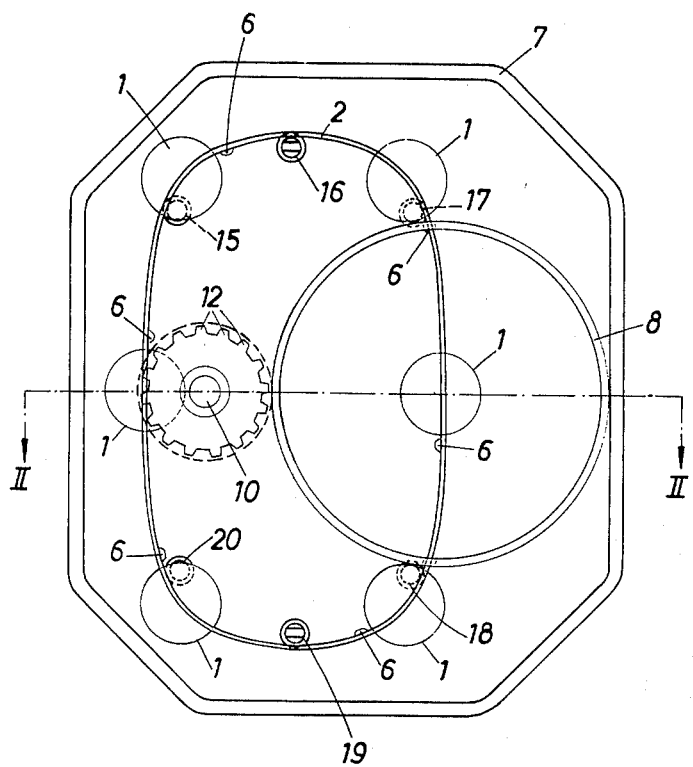
FIG. 1 is a front elevation of the flash assembly of the invention with the cover removed.

A guide means is provided for guiding the band 2 along the path which is shown more clearly in FIG. 1, and it will be noted that this path extends through the reflector 8, which with its cutouts forms a reflector means for receiving the band 2 and the lamps 1 carried thereby. It will be noted from FIG. 1 that the portion of the path which is located in and extends across the interior of the reflector 8 itself is shorter than the distance between the pairs of lamps located on opposite sides of the particular lamp which is at the optical axis of the reflector 8, so that in this way only one lamp may be located at any one time in the reflector means 8. This guide means which guides the endless band 2 for movement along the endless path shown in FIG. 1 includes the pair of sprocket wheels 11 and 12 (FIGS. 1 and 2) which respectively have teeth which extend to the rows of perforations 5, respectively. The sprocket wheel 11 is turnably supported by the rear wall of the housing 7 on a shaft 10 which extends through a suitable bearing in the rear wall and which at the exterior of the housing 7 is connected to a knob 14. The sprocket wheel 11 in the illustrated example is fixed to the shaft 10 for rotary movement therewith, and the front end of the shaft 10 extends into a recess of the cover 13, this recess forming a bearing for the front end of the shaft 10, and adjacent its front end the shaft 10 fixedly carries the sprocket wheel 12, as shown most clearly in FIG. 2. The rear wall of the housing 7 supports for free rotary movement a plurality of guide rolls 15–20, shown mostly clearly in FIG. 1, and these guide rolls engage the inner surfaces of the endless band 2 at the portion of this band which is located to the rear of the lamps 1. Thus, the guide rolls 15–20 cooperate with the wheels 11 and 12 to form part of the guide means for the band 2, this guide means being completed by a series of guide rolls supported for rotary movement by the cover 13 and engaging the inner surface of the band at its front portion which is located beyond the lamps 1. The number of guide rolls carried by the cover 13 at its inner surface corresponds to and are respectively aligned with the guide rolls 15–20 carried by the rear wall of the housing 7, and some of these guide rolls which are carried by the cover are visible in FIG. 2. Thus, FIG. 2 shows the guide rolls 21, 22, and 23 which are carried by the cover 13 and which are respectively aligned with the guide rolls 20, 19, and 18, and the cover 13 turnably carries three additional guide rolls respectively aligned with the guide rolls 15, 16 and 17 and not shown in the drawing. The entire shaft 10 may be yieldably mounted through a suitable spring arrangement, as shown adjacent the knob 14 in FIG. 2, or one or more of the several guide rolls may be yieldably mounted through a suitable spring arrangement, so that in this way a part of the guide means at least is yieldable to make it very easy for the operator to remove an endless band 2 with the lamps carried thereby and to replace this band with another identical band carrying fresh flash lamps 1. Thus, the rolls 16 and 19 are shown slotted in FIG. 1 so that these rolls are flexible transversely of their slots. When a new band 2 with fresh flash lamps 1 has just been introduced into the assembly, the yieldable part of the guide means springs back to its operating position and in this simple way the structure is ready for operation with the band 2 under a certain tension and with the teeth of the sprocket wheels 11 and 12 extending through the perforations 5.

As is shown in FIG. 2, the electrical conductors 27 and 28 are located in the interior of the reflector 8 in the path of movement of the contacts 4 and 3, respectively, so that when any one of the lamps 1 is in its operating position along the optical axis of the reflector 8, the contacts 3 and 4 which are respectively connected to the ends of the filament of this lamp are respectively in engagement with the conductors 27 and 28 which are connected in a conventional way into the circuit of the camera in order to ignite the flash lamp when the shutter is open. Thus, the circuit includes a source of current, a condenser, and the remaining electrical elements which serve to close the circuit when the flash lamp is to be ignited.

Assuming that one of the flash lamps 1 has just been ignited and burnt out, then in order to locate the next flash lamp in its operating position the operator need only turn the knob 14 so that the sprocket wheels 10 and 11 also turn, and it will be noted that these sprocket wheels in addition to forming part of a guide means for the band 2 form part of an advancing means which is manually operated in the case of FIGS. 1 and 2 for manually advancing the band 2 through increments which will successively locate the lamps 1 in the reflector means 8 to be successively ignited therein. The band 2 moves together with the lamp and other elements carried thereby through the cutouts of the reflector means 8 during advancing of the band 2 by the advancing means. As each lamp reaches the optical axis the contacts 3 and 4 engage the reflector contacts 27 and 28 in the manner described above, so that each lamp will be ignited when the circuit is closed. Also, as each lamp 1 reaches the optical axis of the reflector means 8, the projection 6 which corresponds to this lamp engages the shallower notch 9c, as described above, to create an increased resistance to the advancing of the band 2 so as to indicate to the operator that the next lamp 1 has been located in the proper position. This increased resistance is overwound by the operator at the start of the next advancing movement of the band 2, which the operator continues until he feels the next projection 6 engage the side of the reflector to provide an increased resistance in the movement of the band.

Of course, it is possible to provide the shaft 10 with only one sprocket wheel and in this case to provide the band 2 with only one row of perforations, if desired. Furthermore, instead of manual actuation of the advancing means, it is possible to provide a spring or electric motor actuation of the advancing means, and it is equally possible to connect the motor drive for advancing the band 2 to the camera itself to be actuated at the end of an exposure of a film frame in the camera. Furthermore, the drive may be initiated by the stroke of an armature of an electromagnet, and, as will be apparent from the description below, the advancing means which advances the band 2 may take the form of a claw structure similar to that used for advancing the film in a motion picture camera, in which case the sprocket wheel is not relied upon to advance the band but would be used only as part of the guide means.

Moreover, it is possible to simply provide a predetermined relationship between the sprocket wheels and the perforations 5, so that the operator will know that when he turns the knob 14 through a predetermined angle the burnt out lamp will have been displaced from the interior of the reflector and the next following lamp will have been located on the optical axis of the reflector. In this way, when the operator simply turns the knob 14 through a predetermined angle at each advance of the band 2, he will know that the next lamp is in the proper operating position, and it will be unnecessary to provide the projections 6. For example, the parts may be so designed that the knob 14 need only be turned through a single revolution in order to advance the band 2 through the increment necessary to locate the next lamp in its operating position, and for this purpose the exterior surface at the rear of the housing 1 may be provided with an index which the operator matches with an index carried by the knob 14, so that the operator turns the index through a single revolution until it is again aligned with the index carried by the housing, and the operator will know that the knob 14 has been turned through the single revolution required for locating the next lamp in its operating position.

When the cover 13 is removed from the housing 7, the endless band 2 can be very easily slipped out of the cutouts of the reflector 8 and removed from the guide means, part of which is yieldable as described above, and a new band is very easily introduced, this new band 2 being slipped through the cutouts of the reflector and placed around the guide elements of the guide means in the manner described above. Then the cover 13 is replaced, and this cover 13 is formed with a suitable opening through which the front end of the reflector extends. The cover 13 may be maintained in its operating position in any suitable way through manually turnable screws or the like, for example. Also, any suitable springy element may cooperate with one or both of the sprocket wheels for yieldably maintaining the band 2 in engagement with the sprocket wheel.

Figure 4:
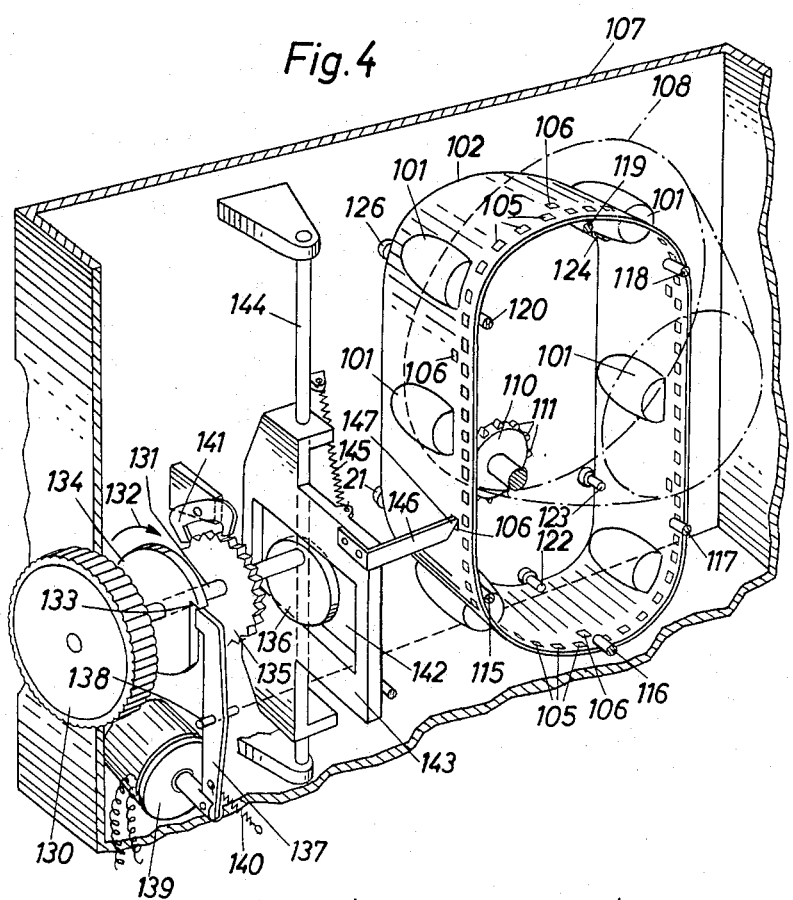
FIG. 4 is a fragmentary perspective illustration of another embodiment of a flash assembly according to the invention.

In the embodiment of the invention which is illustrated in FIG. 4, the endless band 102 may be made of the same material as the band 2, but in the embodiment of FIG. 4 the band 102 does not carry any elements corresponding to the projections 6. Moreover, the band 102 is formed with only one row of perforations 105 corresponding to the perforations 5 shown in FIG. 3. However, the band 102 carries lamps 101 in the same way as the band 2 described above, and these lamps are connected with contacts which are carried by the band 102 and which cooperate in the manner described above with contacts within the reflector means 108 so that it is possible to complete a circuit through each lamp in a manner described below in connection with FIGS. 5 and 6. The band 102 is provided with a second row of perforations 106 which respectively correspond to the lamps 101 and which are spaced from each other by a distance equal to twice the distance between the several lamps 101. The reflector 108, for the sake of clarity, is shown only in dot-dash lines in FIG. 4 carried by the housing 107. The housing 107 supports for free rotary movement the sprocket wheel 110 whose teeth 111 extend into the perforations 105, and in addition the rear wall of the housing 107 as well as its front wall carry several guide rollers which together with the sprocket wheel 110 form a guide means guiding the band 102 for movement along a path which extends through the reflector means 108 which may be identical with the reflector 8 described above. In the embodiment of FIG. 4, the rear unillustrated wall of the housing 107 may be removable so that in this way it is a simple matter to remove the band 102 and replace it with another band carrying fresh flash lamps 101, and it is of course a simple matter to introduce part of the endless band 102 into the reflector itself through the cutouts of the reflector 108, these cutouts being substantially identical with that shown in FIG. 2 and described above. Several of the guide rollers of the guide means are shown in FIG. 4. Thus, the series of guide rollers 115–120 which are connected to the removable rear wall of the housing 107 are indicated in FIG. 4, and in addition the guide rollers 119, 123, 122, 121, and 126 carried by the front wall are also indicated. There is an additional unillustrated guide roller carried by the front wall of the housing 107 and aligned with the guide roller 119 which is connected to the rear wall. One or more of these guide rollers and/or the sprocket wheel assembly 110 is yieldably mounted in the manner described above so as to make it very easy for the operator to remove one band and replace it with another in the manner described above. Of course, if desired, the band 102 may be provided along its front edge with another series of perforations 105, and in this case a second sprocket wheel would be provided to cooperate with such an additional row of perforations.

In the embodiment of FIG. 4, the sprocket wheel 110 forms only part of the guide means and does not participate in the advancing of the band 102 through the increments required to successively locate the lamps 101 in the reflector means 108 to be successively ignited therein. The sprocket wheel 110 is simply supported for free rotary movement and turns in response to advance of the band 102.

In order to advance the band 102, the advancing means of FIG. 4 includes a motor in the form of a spring motor 130 which is of a conventional construction including a spiral spring located in a housing which itself performs the tensioning knob of the spring motor. Thus, the outer end of the spiral spring will be fixed to the outer circular wall of the housing at the inner surface of the circular wall, and the inner end of the spring is fixed to the shaft 131 with respect to which the knob 130 is turnable, a suitable ratchet being provided to maintain the spring under tension, so that the operator need only turn the entire housing or knob 130 in order to tension the spring of the spring motor, and it will be noted the tensioning of the spring as well as the shaft 131 driven thereby both turn in the same direction 132 either during turning of the housing or knob 130 to tension the spring or during driving of the shaft 131 by the spring. A start-and-stop means is provided for starting and stopping the drive from the motor 130, and this means includes the disc 134 which is provided with a single tooth 133 which cooperates with a pawl 137 supported for pivotal movement by a stationary pivot pin 138 which is carried by the housing 107. The shaft 131 in addition to fixedly carrying the disc 134, carries an escapement wheel 135, which is fixedly connected to the shaft 131, and an eccentric disc 136 which is also fixedly connected to the shaft 131. The end of the pawl 137 which is distant from the tooth 133 is pivotally connected to the armature of the electromagnet 139, and this armature is urged to a predetermined rest position by a spring 140 which is connected to the pawl 137 and urges it to turn in that direction which moves the free end of the pawl 137 toward the disc 134 so as to cooperate with the tooth 133 thereof in the manner shown in FIG. 4. The electromagnet 139 is momentarily energized in the manner described below, so that for a moment the tooth 133 is released from the pawl 137 which turns away from this tooth at this time, and as soon as the pawl 137 is momentarily turned away from the tooth 133 the disc 134 is released to the spring of the motor 130 which now turns the shaft 131 and all the parts connected thereto, and this operation will continue through one revolution required to bring the tooth again into the position shown in FIG. 4 where it engages the free end of the pawl 137 so as to stop the rotation of the shaft 131 after it has completed one revolution. Due to the momentary excitation of the electromagnet 139, this electromagnet becomes de-energized immediately after the tooth 133 has moved beyond the free end of the pawl 137, so that during the greater part of the revolution provided by the spring motor the free end of the pawl 137 is urged against the outer periphery of the disc 134 by the spring 140 and immediately moves beneath the tooth 133 as soon as this tooth has completed one revolution, so that in this way the structure will reliably provide a single revolution of the shaft 131 at each actuation or energization of the electromagnet or solenoid 139.

An anchor 141 is supported for free pivotal movement by a suitable bracket which is carried by the housing 107, and this anchor 141 cooperates with the escapement wheel 135 to provide a retarding means which retards the speed with which the shaft 131 is rotated by the motor. Thus, the spring motor is incapable of providing its full power and momentum against the shaft 131 as a result of the retarding means 135, 141 which guarantees a shock-free rotary movement of the shaft 131 and the parts carried thereby. The claw means which is described below cooperates in succession with the perforations 106 for advancing the band 102 by the increments required to locate the lamps 101 successively at the optical axis of the reflector means 108, and as a result of the retarding means 135, 141 it is not possible for the claw means to tear the band 102 at the perforations 106. Moreover, the retarding means prevents the application of any shocks to the assembly, so that there will be no vibrations in the camera as it is held by the operator as a result of the automatically operating structure which advances the band 102 to locate the next lamp in a position to be ignited. Thus, with the retarding means 135, 141, damage to the band 102, which would render this band of no use, is reliably avoided, and at the same time undesirable vibrations are also avoided.

The eccentric disc 136 is located in a slot 142 which is formed in the frame 143 of the claw means. This frame 143 has a pair of ears formed with a pair of aligned openings through which a stationary rod 144 freely passes, so that in this way the rod 144 forms a rod means cooperating with the claw means 143 to guide the claw means for vertical reciprocatory movement along the rod menas 144, as viewed in FIG. 4. Thus, during a single revolution of the eccentric 136, the frame or claw means 143 will move through one stroke upwardly along the rod 144 and then through a return stroke back to its starting position. A spring 145 is connected at one end to the frame 143 and at its opposite end to a stationary part of the housing 107 so as to urge the frame 143 to turn around the axis of the rod 144 with the rear edge of the frame 143 being urged to turn toward the band 102, and of course in this way the frame can yield during turning of the rear edge of the frame 143 away from the band 102, and in this way the rod 144 also supports the frame 143 for rotary movement about the axis of the rod 144. The claw means includes a claw tooth member 146 fixed to the frame 142 and adapted to cooperate with the several perforations 106 for advancing the band 102. Thus, when the shaft 131 starts to turn the claw tooth 146 will move upwardly and will advance the perforation 106 which it engages upwardly, and the stroke which is provided by the eccentric 136 is such that the next lamp 101 is automatically located at the optical axis of the reflector means 108. During the return stroke of the claw means 143 the tooth 146 due to its right inclined edge, as viewed in FIG. 4, simply rides out of the perforation 106 which it previously engaged, and at this time the spring 145 yields to permit the claw means 143 to turn in opposition to the spring 145 about the rod 144, and during the return stroke the tooth 146 simply rides down along the exterior surface of the band 102 until, when the parts have again reached their rest position, the tooth 146 is aligned with the next following perforation 106 and enters into the same under the influence of the spring 145, and thus at the next cycle of operations the band 102 will again be advanced by this claw means. Of course, during the return stroke of the claw means when the tooth 146 rides downwardly along the exterior of band 102, the spring 145 provides a relatively light friction between the tooth 146 and the band 102, so that there is no possibility of movement of the band 102 while the tooth 146 returns to its starting position.

Figures 5, 6:
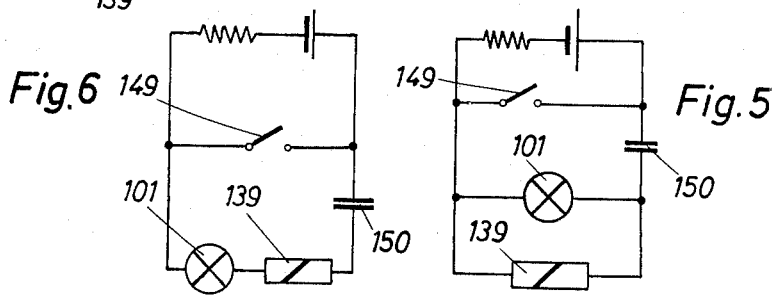
FIG. 5 is a wiring diagram of one possible circuit which can be used with the structure of the invention.
FIG. 6 is a wiring diagram of a second possible circuit which can be used with the structure of the invention.

Referring to FIGS. 5 and 6, the closing of the switch 149 of either one of these circuits represents the switch which is automatically closed upon opening of the shutter of the camera so as to energize and ignite the flash lamp which is in the operating position, and upon closing of the switch 149 of either of the circuits of FIGS. 5 and 6 the condenser 150 of either one of these circuits discharges so as to ignite the flash lamp. In the embodiment of FIG. 5 the electromagnet 139 is connected in parallel with the flash lamp 101, while in the embodiment of FIG. 6 the electromagnet is connected in series with the flash lamp 101, and the electromagnet 139 is constructed in a well known manner so that there will be an approximately 10 ms. delay on the one hand in the energizing of the electromagnet and on the other hand in the de-energizing of the electromagnet, and this electromagnet is only momentarily energized, the duration of the energizing being determined by the length of time that the condenser 150 discharges, this time being extremely short. Thus, during the initial substantially instantaneous period of time after the switch 149 is closed in either of the circuits of FIGS. 5 and 6 the lamp 101 will be ignited and will burn out, and after the delay period of approximately 10 ms. expires the electromagnet 139 will be momentarily energized and then will become de-energized. Due to the delay in the energizing of the electromagnet 139, there is a sufficient period of time for the lamp 101 to become ignited and to burn out, so that the structure for advancing the band 102 to locate the next lamp in the operating position does not start to operate until the previous lamp has been burnt out. In this way the structure operates automatically to advance one lamp to the operating position when the immediately preceding lamp has been burnt out. As was pointed out above, the energizing of the electromagnet 139 moves the pawl 137 away from the tooth 133 so that the spring motor is now free to turn the shaft 131 through one revolution, and the above-described operations take place.

Of course, many variations are possible within the scope of the invention. For example, in the embodiment of FIG. 4, the perforations 105 and the rotary sprocket wheel means 110, 111 are not absolutely essential, and these elements may be omitted if desired. Moreover, the spring motor may be replaced by an electric motor which is also energized immediately after a lamp has been ignited and burnt out.

The capacity of the motor 130 may be arranged that when the spring is fully tensioned the energy of the motor will be sufficient to move all of the lamps carried by the band 102 to their operating positions, so that it only becomes necessary to tension the spring motor when a new band 102 with fresh lamps is placed in the assembly of the invention.

Moreever, a suitable automatic structure may be provided for preventing further operation of the spring motor when all of the lamps in the assembly have been used. With such an arrangement the operator is reminded that he must replace the lamps.

Furthermore, instead of a retarding means which is formed by an anchor and escapement wheel, it is possible to use a gear-type of retarding mechanism.

It will be understood that each of the elements described above, or two or more together, may also find a useful application in other types of cameras differing from the types described above.

While the invention has been illustrated and described as embodied in flash assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a flash assembly for cameras and the like, in combination, an elongated flexible band and a plurality of flash lamps distributed along and carried thereby; stationary reflector means having a cavity and receiving said band and the lamps carried thereby within said cavity; guide means guiding said band for movement along a path extending through said reflector means, the portion of said path in said reflector means being shorter than twice the distance between said lamps so that only one lamp will be located at one time in said reflector means; and motor means cooperating with said band for advancing the same in a stepwise manner through increments successively locating said lamps in said cavity of said reflector means along the optical axis thereof in unignited condition ready to be successively ignited therein; electrical circuit means in contact with a lamp located along the optical axis of said reflector means and including a switch adapted to be closed upon opening of a shutter of the camera to ignite the lamp located along said optical axis, said motor means responding automatically to the ignition and the burning of one lamp for advancing said band through an increment locating the next following lamp in said reflector means.

2. In a flash assembly for cameras and the like, in combination, an elongated flexible band and a plurality of flash lamps distributed along and carried thereby; stationary reflector means having a cavity and receiving said band and the lamps carried thereby within said cavity; guide means guiding said band for movement along a path extending through said reflector means, the portion of said path in said reflector means being shorter than twice the distance between said lamps so that only one lamp may be located at one time in said reflector means; spring motor means cooperating with said band for advancing the same along said path through increments successively locating said lamps in said cavity of said reflector means along the optical axis thereof in unignited condition ready to be successively ignited therein; releasable stop means cooperating with said spring motor means for stopping the operation of the latter after said motor means has advanced said band through a distance equal to the distance between said lamps; electrical circuit means in contact with a lamp located along the optical axis of said reflector means and including a switch adapted to be closed upon opening of a shutter of the camera to ignite the lamp located along said optical axis; and magnetic means responding to the ignition and burning of one lamp and cooperating with said releasable stop means for releasing the latter so that said motor means will then advance the next lamp into said reflector means.

3. In a flash assembly for cameras and the like, in combination, an elongated flexible band and a plurality of lamps distributed along and carried thereby; stationary reflector means having a cavity and receiving said band and said lamps within said cavity; guide means guiding said band for movement along a path extending through said reflector means, the portion of said path in said reflector means being shorter than twice the distance between said lamps so that only one lamp may be located at one time in said reflector means; a driving motor; advancing means driven by said motor and cooperating with said band for advancing the same in a stepwise manner through increments successively locating said lamps in said cavity of said reflector means along the optical axis thereof in unignited condition ready to be successively ignited therein, said advancing means including an eccentric disc eccentrically connected to said motor for rotary movement therewith; retarding means cooperating with said motor for retarding the same to reduce the speed with which said motor actuates said advancing means, said retarding means including an escapement wheel also connected to said motor for rotary movement therewith; and stop-and-start means cooperating with said motor for stopping and starting the operation thereof, said stop-and-start means including an additional disc connected to said motor for rotary movement therewith.

4. In a flash assembly for cameras and the like, in combination, an elongated flexible band and a plurality of lamps distributed along and carried thereby; stationary reflector means having a cavity and receiving said band and said lamps within said cavity; guide means guiding said band for movement along a path extending through said reflector means, the portion of said path in said reflector means being shorter than twice the distance between said lamps so that only one lamp may be located at one time in said reflector means; a driving motor; advancing means driven by said motor and cooperating with said band for advancing the same in a stepwise manner through increments successively locating said lamps in said cavity of said reflector means along the optical axis thereof in unignited condition ready to be successively ignited therein, said advancing means including an eccentric disc eccentrically connected to said motor for rotary movement therewith; retarding means cooperating with said motor for retarding the same to reduce the speed with which said motor actuates said advancing means, said retarding means including an escapement wheel also connected to said motor for rotary movement therewith; and stop-and-start means cooperating with said motor for stopping and starting the operation thereof, said stop-and-start means including an additional disc connected to said motor for rotary movement therewith, said eccentric disc, said escapement wheel, and said disc of said stop-and-start means all being fixedly carried by a shaft which is driven by said motor.

5. In a flash assembly for cameras and the like, in combination, an elongated flexible band and a plurality of flash lamps distributed along and carried thereby; stationary reflector means having a cavity and receiving said band and said lamps within said cavity; guide means guiding said band for movement along a path extending through said reflector means, the portion of said path in said reflector means being shorter than twice the distance between said lamps so that only one lamp will be located at one time in said reflector means; advancing means cooperating with said band for advancing the same in a stepwise manner through increments successively locating said lamps in said cavity of said reflector means along the optical axis thereof in unignited condition ready to be successively ignited therein; motor means cooperating with said advancing means for driving the same; a disc having at least one tooth and connected to said motor means to be rotated thereby; a pawl cooperating with said tooth for preventing rotary movement of said disc and therefore preventing operation of said motor means so that the latter cannot drive said advancing means when said pawl engages said tooth; and magnetic means responding to the ignition and burning of one lamp in said reflector means and cooperating with said pawl for moving the same away from said tooth to release said disc so that said motor means can then actuate said advancing means to locate the next lamp in said reflector means, said pawl cooperating with said tooth to limit the rotation of said disc and to automatically stop the driving of said advancing means by said motor means after said advancing means has advanced said band through one of said increments.

6. In a flash assembly for cameras and the like, in combination, an elongated flexible band and a plurality of lamps distributed along and carried thereby; stationary reflector means having a cavity and receiving said band and lamps within said cavity; guide means guiding said band for movement along a path extending through said reflector means, the portion of said path in said reflector means being shorter than twice the distance between said lamps so that only one lamp will be located at one time in said reflector means; advancing means cooperating with said band for advancing the same through increments successively locating said lamps in said cavity of said reflector means along the optical axis thereof in unignited condition ready to be successively ignited therein; motor means cooperating with said advancing means for driving the same; and escapement means cooperating with said motor means for retarding the speed with which the latter drives said advancing means, said escapement means including an escapement wheel driven by said motor means and an anchor cooperating with said escapement wheel.

7. In a flash assembly for cameras and the like, in combination, an elongated flexible band and a plurality of flash lamps distributed along and carried thereby; stationary reflector means having a cavity and receiving said band and said lamps within said cavity; guide means guiding said band for movement along a path extending through said reflector means, the portion of said path in said reflector means being shorter than twice the distance between said lamps so that only one lamp will be located at one time in said reflector means; claw means cooperating with said band for advancing the same in a stepwise manner along said path through increments successively locating said lamps in said cavity of said reflector means along the optical axis thereof in unignited condition ready to be successively ignited therein, said claw means including a plate formed with an elongated slot; an eccentric disc in said slot; a shaft carrying said disc; and a motor operatively connected to said shaft for rotating the same and said eccentric disc therewith, so that said motor drives said claw means.

8. In a flash assembly for cameras and the like, in combination, an elongated flexible band and a plurality of flash lamps distributed along and carried thereby; stationary reflector means having a cavity and receiving said band and said lamps within said cavity; guide means guiding said band for movement along a path extending through said reflector means, the portion of said path in said reflector means being shorter than twice the distance between said lamps so that only one lamp will be located at one time in said reflector means; claw means cooperating with said band for advancing the same in a stepwise manner along said path through increments successively locating said lamps in said cavity of said reflector means along the optical axis thereof in unignited condition ready to be successively ignited therein, said claw means including a plate formed with an elongated slot; an eccentric disc in said slot; a shaft carrying said disc; a motor operatively connected to said shaft for rotating the same and said eccentric disc therewith, so that said motor drives said claw means; and elongated rod means cooperating with said claw means to guide the latter for reciprocatory movement back and forth along said rod means as well as for oscillatory movement around the axis of said rod means.

9. In a flash assembly for cameras and the like, in combination, a supporting strip having longitudinal edges and a face located between said edges and having a plurality of consecutive openings located within a longitudinal region of said strip being narrower than the width thereof so as to provide longitudinal flat margin means outside of said longitudinal region; a plurality of flash lamps respectively arranged in said openings projecting beyond opposite sides of said strip; a plurality of contact means arranged in said longitudinal margin means of said strip spaced from each other in longitudinal direction of said strip and respectively electrically connected to said flash lamps; stationary reflector means having an optical axis; guide means engaging said margin means for guiding said strip in longitudinal direction along a path extending through said reflector means; stationary contact means mounted on said guide means opposite the path of said contact means in said margin means of said strip and arranged so as to contact said contact means on said strip of one of said lamps when said one lamp is located along said optical axis; and motor means responding automatically to the ignition and burning of one lamp and cooperating with said strip for advancing the same in stepwise manner through increments successively locating said lamps in said reflector means along the optical axis thereof in unignited condition ready to be successively ignited therein.

References Cited by the Examiner

UNITED STATES PATENTS

| | | | |
|---|---|---|---|
| 1,710,207 | 4/1929 | Cook | 40—86 |
| 1,964,879 | 7/1934 | Jelinek | 40—86 X |
| 2,258,575 | 10/1941 | MacKay | 240—37.1 |
| 2,408,470 | 10/1946 | Noel et al. | 240—37 |
| 2,427,969 | 9/1947 | Lester | 240—37 X |
| 2,485,404 | 10/1949 | Noel | 240—37 |
| 2,498,476 | 2/1950 | Alfonso | 40—86 |
| 2,733,633 | 2/1956 | Wottring | 352—192 |
| 2,789,205 | 4/1957 | Schwartz et al. | 240—1.3 |
| 2,839,667 | 6/1958 | Cannella | 240—1.3 |
| 2,852,134 | 9/1958 | Werner | 67—31 X |
| 2,864,938 | 12/1958 | Shaw et al. | 240—37 |
| 2,981,088 | 4/1961 | Kaprelian | 67—31 |
| 3,014,122 | 12/1961 | Hornack | 240—1.3 |

NORTON ANSHER, *Primary Examiner.*